July 1, 1969  H. A. ECKHARDT  3,452,865
APPARATUS FOR DISCHARGING PARTICULATE MATERIALS
Filed Dec. 18, 1967

INVENTOR.
HANS A. ECKHARDT

United States Patent Office 3,452,865
Patented July 1, 1969

3,452,865
APPARATUS FOR DISCHARGING PARTICULATE
MATERIALS
Hans A. Eckhardt, 55 Crescent Bend,
Allendale, N.J. 07401
Filed Dec. 18, 1967, Ser. No. 698,367
Int. Cl. B03c 1/30
U.S. Cl. 209—39                                      14 Claims

ABSTRACT OF THE DISCLOSURE

An apparatus for discharging powder, pellets, and other particulate materials from a hopper to a vertical screw extending therein has a horizontal annular rim formed by the interior surface of the hopper ascending at its lower part, and by a vertical opening in the screw's housing. A spreader is mounted above the rim and has a larger diameter than the rim. Air is introduced at the lower part of the hopper and through the feed screw to fluidize the material so that heavier foreign particles settle down at the bottom. Metal particles bridging the distance between electrically conductive members close a circuit for signaling and monitoring equipment.

This invention relates to the field of discharging, feeding and extruding particulate materials, and more particularly, to an extruder with a feed screw having a vertical axis.

A conventional horizontal extruder comprises a horizontal screw housing and rotatably mounted therein an extrusion screw. The screw housing carries an extrusion die or an injection nozzle at the downstream end and has a feed opening or throat at its upstream part. With low bulk density materials it has become customary to have a vertical screw housing mounted to the feed throat of the extruder, with a feed screw having a vertical axis rotatably mounted therein. At its upper end the vertical screw housing opens up into a usually straight conical hopper with a linear increase in diameter. Such devices are known as forced feed hoppers, crammer feeders, power feeders, precompression hoppers, and precompactors for horizontal extruders.

In contrast a vertical extruder includes a vertical screw housing and a feed screw mounted therein. Most vertical extruders have the drive mounted below and have the extrusion die at the lower part of the screw housing. At its upper end the vertical screw housing then opens up into a usually straight conical hopper with a linear increase in diameter. Different types of vertical extruders have the drive and the feed hopper at the upper end and the extrusion die at the lower end of the screw housing. Still another vertical extruder type has the drive below the screw housing, the feed throat at the lower part, and the extrusion die at the upper part of the screw housing.

Difficulties have been encountered on both the forced feed hoppers for horizontal extruders as well as on vertical extruders, whenever the material to be extruder contains foreign particles which frequently get into the material accidentally during preceding production and handling operations. Such foreign particles often consist of steel, bronze, aluminum and other metals or of glass, ceramics, stone. They have again and again caused severe damage to the feed and extrusion screws and to their screw housings as well as to extrusion dies, injection nozzles and other sensitive equipment downstream.

With the advent of extrusion screws designed for more intensive mixing, milling and blending, and of twin-screws, the damage has been on the increase since in such equipment the foreign particles have a lesser chance to be conveyed through the extruder and are usually sheared and torn into small pieces, at the same time heavily damaging the feed and extrusion screws and their screw housings.

Aside from the damage to processing machinery, foreign particles included in the extrudate have made large quantities of extruded or molded products unusable. The financial losses have been more severe by the lack of efficient methods to check extruded or molded products for enclosed foreign particles, with the result that large production quantities have been scrapped when foreign particles were either actually enclosed or only suspected.

Many attempts have been made to remove foreign particles from the feed material. One approach is sifting the feed material through a screen before it enters the extruder. This method involving an additional operation is only suitable for well flowing materials, but not for tacky and sticky materials. Furthermore, only such foreign particles can be screened out which are larger than the largest particle of the material to be processed. Very often the processed material particles are relatively large, as with polymer pellets, granulated chips, comminuted plastic products, and therefore foreign particles of comparable size can still damage equipment and, even more so, will cause the rejection of the extruded production.

Another method is the use of grate magnets upstream of the extruder. It is obvious that only ferro-magnetic particles can be expected to be removed. In the industry, however, stainless steel, bronze, aluminum and other non-magnetic metals are more and more used. Bolts, screws, nuts and other elements made of those metals sometimes come loose from upstream equipment or get otherwise into the screw extruder. Furthermore, in many operations magnetized bars obstruct the flow of material excessively and therefore can not be used. In addition it has been found that even ferro-magnetic bodies are often not retained by the grate magnets, if the gravity forces overcome the magnetic forces. With electro-magnets accidental switching off-on of the electric power supply, even if for a short moment only, has dumped the accumulated ferrous metal particles together in the extrusion equipment, with even more severe consequences. Similar occurrences have taken place with permanent magnets after their magnetic fields had decreased below a certain level.

Another method described in Kiesskalt U.S. Patent 2,148,205 provides a hollow space at the discharge end of the upper of two screws. Foreign particles having entered the upper screw are frequently caught during their travel along the entire length of the screw in the nip between the two counter-rotating screws thus causing severe damage, before they have a chance to reach the space provided for them at the downstream end of that screw.

A further attempt described in Goetz U.S. Patent 2,127,726, provides an escape for tramp metal on top of the screw housing, downstream of the feed throat. Besides the fact that at this point damage already has occurred, the usually heavy foreign particles cannot be expected to travel upward against the law of gravity. Similar devices are described in Carter U.S. Patent 2,186,404, Guthrie U.S. Patent 2,225,215 and Nelson U.S. Patent 2,233,707.

It is an object of the present invention to discharge particulate material from a hopper to a vertical feed screw and at the same time to automatically and reliably remove foreign particles, ferro-magnetic and non-magnetic, metallic and non-metallic, from the material flow, without interrupting that material flow.

It is another object to automatically and reliably retain the foreign particles removed from the material flow in a location where they are automatically monitored to the machine operator.

It is a further object to automatically monitor foreign particles even before they arrive at the retaining location.

It is a further object to remove the foreign particles from the hopper without interrupting the extrusion operation.

It is a further object to improve the flow of material through the hopper to the vertical feed screw.

It is a further object to heat, dry or otherwise treat the material while flowing through the hopper to the vertical feed screw.

Generally speaking, the present invention contemplates an improvement in an apparatus for discharging particulate materials, comprising a compartment, more specifically a hopper, for receiving and containing particulate material. The compartment has at the bottom an interior surface ascending toward a central annular rim which is formed by that interior surface and by a vertical bore in a screw housing located below the compartment. A feed screw is mounted for rotation in that vertical bore of the screw housing extending in that compartment. Above the rim is positioned a spreader which has a larger radial width than the rim. The lower part of the compartment and the feed screw are provided with means for introducing gases into the material contained in the compartment. The compartment carries sensing means based on principles of magnetism, electricity or radiation to detect and to retain foreign particles in the compartment.

These and other objects, advantages, features and uses will become apparent by reference to the following description when taken in connection with the accompanying drawings showing preferred embodiments, wherein.

Figure 1:
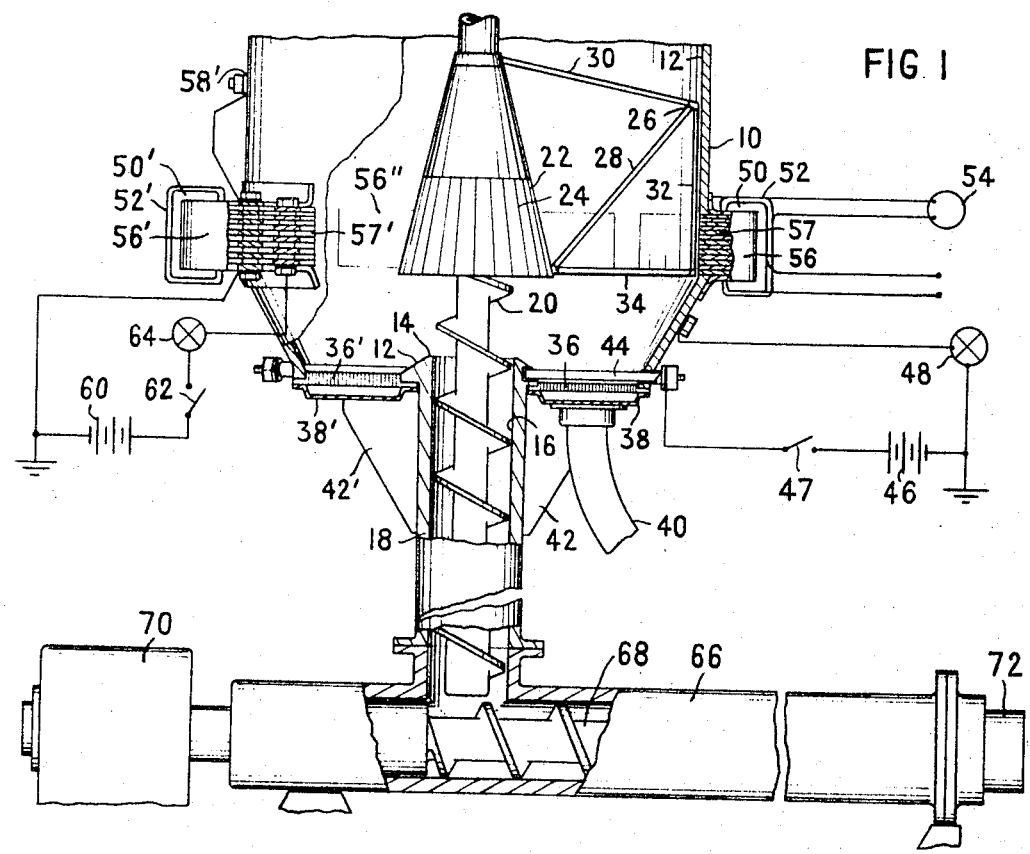
FIGURE 1 is an elevational view, partly in section, of one embodiment of the apparatus.

Referring to the drawings, FIGURE 1, there is shown an apparatus for discharging particulate material, often called forced feed hopper, power feeder, crammer feeder or precompacting hopper. The compartment 10 which receives and contains particulate material has an interior surface 12 ascending at the bottom toward a horizontal annular rim 14 in the center of the bottom's interior surface 12. The inside of the rim 14 is formed by a vertical bore 16 in a screw housing 18 located below the compartment 10. A feed screw 20 is mounted for rotation in the vertical bore 16 of the screw housing 18, extending in the compartment 10. The feed screw 20 is rotated by a drive (not shown) located at its upper end.

A spreader 22 is positioned above the rim 14, and has a substantially larger radial width than the rim 14. The spreader 22 and other parts of the feed screw 20 above the spreader are provided with means for introducing air or other gases into the material contained in the compartment 10. To that end the lower portion of the spreader 22 has slots 24 with a width smaller than the smallest particle size of the processed material. Alternatively the surface of the spreader 22 or parts thereof can have other kinds of perforations, or can be formed by a sheet of porous material, or by a screen with sufficiently small mesh size.

The spreader 22 forming part of the feed screw is equipped with an agitator 26 which includes at least one element 28 extending from the outward portion of the spreader 22 in an outward and upward direction. Other members of the agitator are designated with 30, 32 and 34. While for reasons of simplicity only one agitator 26 is shown, there is usually one more agitator mounted diametrically to the feed screw 20.

The lower part of the compartment 10 is provided with means for introducing air or other gases into the material contained therein, comprising the perforated plates 36, 36', the covers 38, 38' and the duct 40. In place of the perforated plates 36, 36' other gas-permeable materials may be used, such as porous metal, metal cloth, screens, or nozzles with a screen filter always having openings for the air smaller than the smallest particle size of the processed material, and forming part of the interior surface 12 of the compartment 10. The means for introducing air are mounted in 4 sectorial, identical sets, with only 2 diametral sets visible, comprising the perforated plates 36, 36', and the covers 38, 38'. The 4 sectorial sets are separated by 4 radial diametral ribs of which 2, 42 and 42', are shown. They form 4 rigid connections between the compartment 10 and the screw housing 18.

In the lower part of the compartment 10 across the bottom thereof extend electrically conductive members 44 which are in contact with the material contained in the compartment 10, electrically insulated from the compartment 10 and electrically connected via a switch 47 to one pole of an electrical energy source, more specifically a battery 46 of which the other pole is electrically connected to the compartment 10 via current indicating means, more specifically a signal light 48, to signal the presence of electrically conductive particles bridging the distance between any of the members 44 and the interior surface 12 of the compartment 10.

The lower part of the sidewall of the compartment 10 is provided with magnetic means to pull magnetic particles to the interior surface 12 of the compartment 10. These magnetic means are shown as including a primary winding 50 which induces into a secondary winding 52 a voltage changed by foreign particles changing the magnetic field, the change in voltage being used for indicating the presence of such foreign particles by a millivoltmeter 54, or other voltage or current indicating means.

The magnetic means include a laminated core 56' which forms part of the interior surface 12 of the compartment 10. The laminated core 56' has the odd numbers of insulated laminae 57' electrically connected by a connection 58' to the compartment 10 and to one pole of a battery 60, or another electric energy source, of which the other pole is electrically connected to the even numbers of insulated laminae 57' via switch 62 and a signal light 64 or other current indicating means, to signal the presence of electrically conductive particles bridging the distance between any even and any odd numbers of laminae 57' and the compartment 10.

There are four sets of magnetic means each covering one quadrant of the circumference of the compartment 10. Only two diametral sets with the cores 56 and 56', the primary windings 50 and 50', and the secondary windings 52 and 52' are visible in detail. Of a third set only the core 56" is visible; its laminae are not detailed by horizontal lines to avoid undue crowding of the drawing.

The screw housing 18 is mounted to a screw barrel 66 wherein an extruder screw 68 is mounted for rotation by the drive 70. The barrel 66 has attached to its downstream end an extrusion die 72.

In operation, powder, flakes, granules, beads, pellets, chips or other particulate material received by the compartment 10 is guided by the spreader 22 to the periphery of the compartment 10. The material flow is improved by air or other gases introduced through the slots 24 of the spreader 22 and through the perforated metal plates 36, 36' to achieve a desirable degree of fluidization, with the result that the material flows similarly to a fluid toward the bottom of the compartment 10 and over the rim 14 into the screw housing 18 wherein the feed screw 20 forces the material to the extruder screw 68 which pushes the material through the extrusion die 72.

The air is preferably heated or dried or both to perform a heating or drying operation or both in the forced feed hopper. The air flows, together with the air expelled by the feed screw 20 which also serves to fluidize the material, in an upward direction to the top of the compartment 10 where it is removed to atmosphere, to an exhaust or to a vacuum pump after having passed a filter or cyclone (not shown).

For such sticky, tacky materials which permit little fluidization the spreader 22 is equipped with an agitator 26 having elements 28, 32, 34 which cut out of the material an annular cake of triangular cross-section which is continually sliced by the element 34 as it sinks deeper and deeper pushing the material below toward the feed screw 20. Into the vacated space sinks, while being sliced into layers by element 28, the material cut out as an annular cake by the elements 28, 30 and the spreader 22. The material further up sinks down between essentially vertical surfaces while being sliced by the element 30.

The material is fluidized to such a degree that ferro-magnetic particles achieve sufficient freedom of movement to be pulled toward the laminated cores 56, 56', 56". Even before reaching them, ferro-magnetic particles as well as other foreign particles passing by cause a change in the voltage induced in the secondary windings 52, 52', measured by the millivoltmeter 54 or other voltage or current indicating instruments from where a signal for monitoring equipment can easily be derived. It is obvious that at least the portion of the compartment 10 near the cores 56, 56', 56" and the agitator 26, if used at all, are preferably made of non-magnetic materials, such as stainless steel, aluminum or polymeric materials.

When ferro-magnetic or other conductive material particles reach the laminated cores 56, 56', 56", they bridge the space between odd numbers and even numbers of the laminae 57, 57' and the compartment 10, and cause a current to flow through the signal light 64 or other current monitoring means. The agitator element 32 is shown as wiping the interior surface of the cores 56, 56', 56". In some cases it is desirable to recess that element 32 further away from these cores.

In the fluidized material heavier foreign particles, whether ferro-magnetic or not, whether electrically conductive or not, will settle down at the bottom of the compartment 10 where they remain, retained by the rim 14, until they are cleaned out. Electrically conductive particles bridging the distance between the perforated plates 36, 36', surrounding portions of the interior surface 12, and conductive members 44, 44' partly embedded therein, will cause a current to flow through the signal light 48 or through other current monitoring means. The material, after foreign particles thus removed, flows over the rim 14 into the screw housing 18 for compacting by the feed screw 20.

Figure 2:
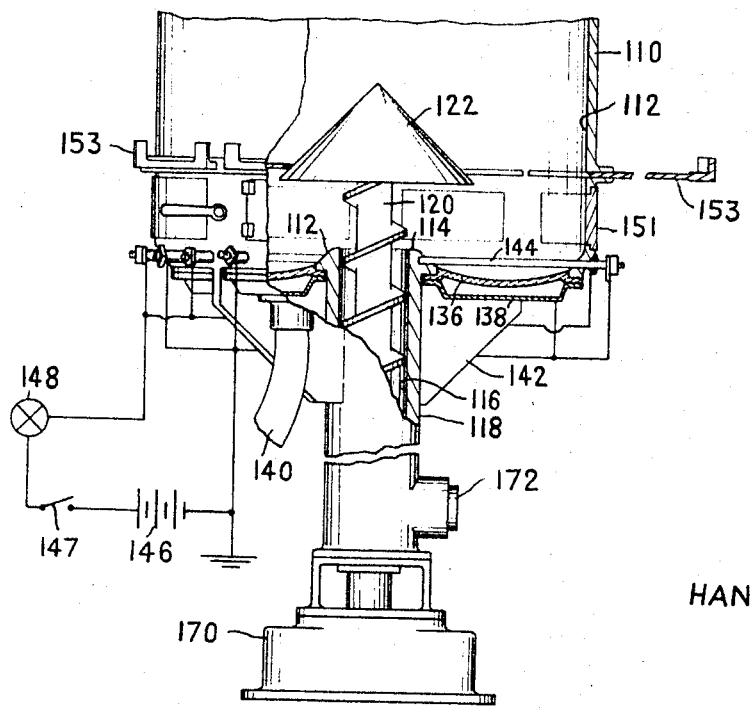
FIGURE 2 is an elevational view, partly in section, of another embodiment of the apparatus.

FIGURE 2 shows a different embodiment of the apparatus. A compartment 110 has an interior surface 112 ascending at the bottom toward a central annular rim 114 which is formed by the interior surface 112 and by a vertical bore 116 in a screw housing 118 located below the compartment 110. A feed screw 120 is mounted for rotation in the vertical bore 116 of the screw housing 118, extending in the compartment 110. The screw housing 118 carries at its lower part an extrusion die 172 and is mounted to the feed screw drive 170.

A spreader 122 is positioned above the rim 114 and has a substantially larger radial width than the rim 114. The spreader is shown as having a conical contour, but may have any suitable tapered or double-conical shape. The spreader 122 may have a porous, perforated or otherwise gas-permeable surface, through which air or other gases supplied through the usually hollow bored feed screw 120 are introduced into the material.

The lower part of the compartment 110 is provided with means for introducing air or other gases into the material contained therein. These means form part of the interior surface 112 of the compartment 110 and comprise the gas-permeable plates 136, the covers 138 and the ducts 140 which are mounted in four sectorial identical sets with three sets partially visible. The four sectorial sets are separated by four radial diametral ribs 142, of which two are shown. They form four rigid connections between the screw housing 118 and the compartment 110.

In the lower part of the compartment 110 across the bottom thereof extend electrically conductive members 144 which are in contact with the material contained in the compartment 110. The members 144 with even numbers are electrically connected to the compartment 110 and to one pole of a battery 146 or another electric energy source of which the other pole is electrically connected via a switch 147 and a signal light 148 to the members 144 with odd numbers being electrically insulated from the compartment 110.

While this described device is located in the compartment 110, it is understood that there may be applied other sensing means based on electricity, magnetism or radiation of which one part is carried by the compartment 110 and another part is carried by the feed screw 120 or the spreader 122.

For easy access to the interior surface 112, access doors 151 are provided in the lower part of compartment 110, and shut-off gates 153 above the access doors 151 which are mounted in four sectorial sets.

In operation, powder, flakes, granules, pellets, chips or other particulate materials are received by the compartment 110 and are guided by the spreader 122 to the periphery of the compartment 110. The material flow is improved by air or other gases introduced through the gas-permeable plates 136 to obtain a suitable degree of fluidization, so that the material flows similarly to a fluid toward the bottom of the compartment 110 and over the rim 114 into the screw housing 118 wherein the feed screw 120 forces the material to the extrusion die 172.

Heavier foreign particles settle down at the plates 136 where they remain, retained by the rim 114. Electrically conductive particles bridging the distance between any of the members 144 with odd numbers and any of the members 144 with even numbers and the compartment 110 will close the circuit and cause a current to flow through the signal light 148 or other current monitoring means.

To remove foreign particles thus accumulated, without emptying out the entire material from the compartment 110, the shut-off gates 153 are pushed toward the center of the compartment 110 until they reach the spreader 122, thus closing the flow of material from the upper part of the compartment 110 to the feed screw 120. Then easy access to the interior surface 112 of the compartment 110 is facilitated through the access doors 151.

Althugh the present invention has been desribed in conjunction with particular embodiments, it is apparent to those skilled in the art that modifications and variations are possible without departing from the spirit and scope of the invention. For instance, the feed screw may be off center of the compartment; the axes of the compartment or of the feed screw or both may be tilted from the vertical position; more than one feed screw may be applied, either divergent or parallel, and in the latter case either intermeshing or spaced apart; the feed screw may carry flights above the spreader; the feed screw may extrude in upward direction in which case another and larger part of the screw housing is located above the rim and above the hollow spreader which then may be part of the screw housing; the compartment and also the screw housing may have conical sidewalls; the odd numbers of laminae and of electrically conductive members may be exchanged against the even numbers and vice versa; various types of baffles may be used to improve the flow of the gases and of the material; besides air, other gases may be applied, when certain reactions are to be performed or prevented respectively, such as reducing, oxidizing, calcining, activating, or purging with inert gas.

In the described embodiments surfaces are shown to be provided for sealing against gases and the material. The seals, however, are not shown because of their size and for better clarity. Also not shown are bolts, screws, nuts to connect parts shown as being provided with flanges for such connections.

I claim:

1. Apparatus for discharging particulate material comprising:

a compartment for receiving and containing particulate material, having an interior surface ascending at the bottom toward a central annular rim which is formed by said interior surface and by a vertical bore in a screw housing located below said compartment;

a feed screw mounted for rotation in said vertical bore of said screw housing, extending in said compartment.

2. Apparatus for discharging particulate material as claimed in claim 1 wherein a spreader positioned above the rim has a larger radial width than said rim.

3. Apparatus for discharging particulate material as claimed in claim 2 wherein the feed screw above the rim is equipped with an agitator having an element extending from the outward portion of the spreader in an outward and upward direction.

4. Apparatus for discharging particulate material as claimed in claim 2 wherein the lower part of the compartment is provided with means for introducing a gas into the material contained therein, said means forming part of the compartment's interior surface.

5. Apparatus for discharging particulate material as claimed in claim 4 wherein the feed screw is provided with means for introducing a gas into the material within the compartment.

6. Apparatus for discharging particulate material as claimed in claim 2 wherein electrically conductive members are positioned in the lower part of the compartment, said members being in contact with the material contained in said compartment, electrically insulated from said compartment and electrically connected to one pole of an electric energy source, of which the other pole is electrically connected to said compartment via current indicating means to signal the presence of electrically conductive particles bridging the distance between any of said members and the interior surface of said compartment.

7. Apparatus for discharging particulate material as claimed in claim 2 wherein electrically conductive members are positioned in the lower part of the compartment, said members being in contact with the material contained in said compartment, the members with even numbers electrically connected with said compartment and with one pole of an electric energy source, of which the other pole is electrically connected to the members with odd numbers, which are electrically insulated from said compartment, via current indicating means to signal the presence of electrically conductive particles bridging the distance between any of the odd numbers and any of the even numbers of said members and said compartment.

8. Apparatus for discharging particulate material as claimed in claim 2 wherein the lower part of the compartment is provided with magnetic means to pull magnetic particles to the interior surface of said compartment.

9. Apparatus for discharging particulate material as claimed in claim 8 wherein the magnetic means include a primary winding which induces into a secondary winding a voltage changed by foreign particles changing the magnetic field, the change in voltage being used for indicating the presence of such foreign particles.

10. Apparatus for discharging particulate material as claimed in claim 8 wherein the magnetic means include a laminated core which forms part of the interior surface of the compartment, the laminated core having the odd numbers of insulated laminae electrically connected to said compartment and to one pole of an electric energy source, the other pole of which being electrically connected to the even numbers of said insulated laminae via current indicating means to signal the presence of electrically conductive particles bridging the space between any even and any odd numbers of said laminae and said compartment.

11. Apparatus for discharging particulate material as claimed in claim 2 wherein the compartment carries one part, and the feed screw another part of sensing means selected from those based on principles of magnetism, electricity, and radiation to detect foreign particles in said compartment.

12. Apparatus for discharging particulate material as claimed in claim 2 wherein an access door is provided in the lower part of the compartment for easy access to the interior surface of said compartment, and a shut-off gate above the access door, to open and close the flow of material from said compartment to the feed screw.

13. Apparatus for discharging particulate material comprising:

a hopper compartment for receiving particulate material;

a screw housing located below and having an opening communicating upward with said hopper compartment;

a circumferential rim, with the outside ascent formed by the interior surface of said hopper compartment's lower part, the inside ascent formed by the opening of said screw housing;

a feed screw rotatably mounted in and extending through said opening of said screw housing;

a spreader mounted above said rim in said hopper compartment, having a larger radial width than said rim, causing particulate material to flow over said rim before entering said feed screw rotating in said screw housing.

14. Apparatus for discharging particulate material as claimed in claim 13, wherein the lower part of the hopper compartment is provided with means for introducing a gas into the material contained therein, fluidizing the material and causing heavy particles to settle down at the lower part of said hopper compartment.

References Cited

UNITED STATES PATENTS

| | | | |
|---|---|---|---|
| 245,427 | 8/1881 | Averell | 302—50 X |
| 2,102,330 | 12/1937 | Newcomer | 302—50 |
| 2,290,930 | 7/1942 | Wurzbach | 324—41 |
| 3,278,986 | 10/1966 | Welt. | |

TIM R. MILES, *Primary Examiner.*

U.S. Cl. X.R.

18—12; 209—138, 223, 225; 222—195, 413; 302—50; 324—41